(12) United States Patent
Miki

(10) Patent No.: US 7,556,310 B2
(45) Date of Patent: Jul. 7, 2009

(54) VEHICLE FRONT STRUCTURE

(75) Inventor: Kenjiro Miki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 12/014,951

(22) Filed: Jan. 16, 2008

(65) Prior Publication Data
US 2008/0224502 A1 Sep. 18, 2008

(30) Foreign Application Priority Data
Mar. 16, 2007 (JP) .............................. 2007-067758

(51) Int. Cl.
*B60J 7/00* (2006.01)
(52) U.S. Cl. .............. 296/204; 296/193.07; 296/203.02
(58) Field of Classification Search ............ 296/203.02, 296/204, 203.01, 187.09, 29, 30, 193.07, 296/184.1
See application file for complete search history.

(56) References Cited

U.S. PATENT DOCUMENTS

| | | | |
|---|---|---|---|
| 4,509,790 | A | 4/1985 | Nagamoto et al. |
| 6,203,099 | B1 * | 3/2001 | Iwatsuki .................... 296/204 |
| 7,147,275 | B2 | 12/2006 | Matsuyama et al. |

2002/0195840 A1 12/2002 Mishima et al.

FOREIGN PATENT DOCUMENTS

| | | |
|---|---|---|
| DE | 2408548 A1 | 8/1975 |
| DE | 19633908 A1 | 2/1998 |
| EP | 1029773 A2 | 8/2000 |
| EP | 1029773 A3 | 3/2002 |
| JP | 2003-182633 | 7/2003 |

OTHER PUBLICATIONS

Official Action for European Patent Application No. 08004022.3 corresponding to the instant U.S. Appl. No. 12/014,951.
European Search Report EP 08 00 4022 dated Apr. 16, 2008.

* cited by examiner

*Primary Examiner*—Joseph D Pape
(74) *Attorney, Agent, or Firm*—Studebaker & Brackett PC; Donald R. Studebaker

(57) ABSTRACT

A middle branch frame portion is configured such that a front end portion is connected to a front side frame via s suspension-frame attaching bolt to fasten a suspension frame, a middle portion extends to a tunnel portion that is provided at the center portion in the vehicle width direction so as to project upward, and a rear portion is provided below (vehicle outside) an upper corner portion of the tunnel portion so as to extend along the upper corner portion. Accordingly, there can be provided a vehicle front structure with a pair of front side frames provided at both sides of a vehicle body so as to extend in a vehicle longitudinal direction that can disperse the load properly even when a larger fontal-crash impact load acts.

11 Claims, 13 Drawing Sheets

Vehicle Forward

VEHICLE FRONT STRUCTURE

BACKGROUND OF THE INVENTION

The present invention relates to a vehicle front structure with a pair of front side frames.

Conventionally, a vehicle front structure of an automotive vehicle is known, in which a pair of front side frames is provided at both sides of a vehicle body so as to extend in a vehicle longitudinal direction and a vehicle-frontal-crash impact load acting on the front side frames is transmitted to a rear-located member (such as a roof panel) properly.

Japanese Patent Laid-Open Publication No. 2003-182633 and U.S. Pat. No. 7,147,275, for example, have proposed a vehicle structure, in which a middle portion of the front side frame and a front pillar or the like are interconnected by a connection frame that extends substantially vertically and the vehicle-frontal-crash impact acting on the front side frame is dispersed and transmitted to the front pillar or the like via the connection frame.

Herein, it may be preferable that the impact load acting on the front side frames be dispersed by using as many rear members as possible in order to support a larger load at the vehicle frontal crash properly.

In the vehicle structure proposed in the above-described patent publications, however, the load acting on the front side frames is transmitted only to the front pillar. Accordingly, there is a concern that the proper dispersion of the impact load may not be properly conducted against a larger crash impact.

SUMMARY OF THE INVENTION

The present invention has been devised in view of the above-described concern, and an object of the present invention is to provide a vehicle front structure with a pair of front side frames provided at both sides of a vehicle body so as to extend in a vehicle longitudinal direction that can disperse the impact load properly even when a considerably large fontal-crash impact load acts.

According to the present invention, there is provided a vehicle front structure, comprising a pair of front side frames provided at both sides of a vehicle body so as to extend in a vehicle longitudinal direction, a dash panel provided behind the front side frames so as to partition an engine room from a vehicle compartment, a tunnel portion provided at a center portion of the dash panel and a floor panel of the vehicle compartment in a vehicle width direction so as to project upward, and a center-side frame member provided below the tunnel portion so as to extend substantially along an upper corner portion of the tunnel portion, a front end portion of which is located in front of the tunnel portion and connected to the front side frame, a rear portion of which is located on a vehicle-inward side from the front end portion and connected to a lower face of the upper corner portion of the tunnel portion so as to form a substantially closed cross section with the upper corner portion of the tunnel portion.

According to the present invention, the front side frame and the tunnel portion are connected by the center-side frame member, and particularly at the rear portion of the center-side frame member is provided the closed cross section that is formed between the upper corner portion of the tunnel portion and the center-side frame member. Thereby, a considerably large frontal-crash impact load that acts on the front side frames can be transmitted surely to the tunnel portion as a rigidity member, thereby providing a proper dispersion of load to the tunnel portion. It is preferable that the center-side frame member be disposed so as to extend rearward as long as possible along with the tunnel portion. This is because the load dispersion may be conducted to an entire part of the tunnel portion.

According to an embodiment of the present invention, a rear end of the center-side frame is connected to a cross member that is provided so as to extend in the vehicle width direction. Thereby, the load can be also transmitted to the cross member. Thus, the frontal-crash impact load can be supported surely by using the cross member as the vehicle-body rigidity member at the vehicle rear.

According to another embodiment of the present invention, a front portion of the center-side frame has a substantially closed cross section that is formed with two members connected to each other, an upper-located member of the two members is connected to an outside-face portion of the dash panel, and a longitudinal member is provided inside the vehicle compartment above the tunnel portion so as to extend substantially along the upper corner portion of the tunnel portion, a front end of the longitudinal member being connected to an inside-face portion of the dash panel that corresponds to a connection portion of the upper-located member to the dash panel. Thereby, since the longitudinal member is provided inside the vehicle compartment so as to correspond to the upper-located member of the center-side frame member, the frontal-crash impact load can be also transmitted to the longitudinal member inside the vehicle compartment. Accordingly, the proper dispersion of can be accomplished by using the longitudinal member regardless of a strength of the dash panel. Thus, the larger impact load can be dispersed without reinforcing the dash panel.

According to another embodiment of the present invention, the longitudinal member and the center-side frame member are provided so as to form respective closed cross sections with the upper corner portion of the tunnel portion. Thereby, a proper longitudinally-extending frame member with the closed cross section can be formed at the upper corner portion of the tunnel portion regardless of the structure, such as a shape, of the upper corner portion of the tunnel portion. Thus, the frontal-crash impact load can be transmitted to the tunnel portion without considering the strength of the upper corner portion of the tunnel portion, thereby improving function of the vehicle body for the crash.

According to another embodiment of the present invention, the longitudinal member is provided on the tunnel portion so as to form a substantially closed cross section with the upper corner portion of the tunnel portion. Thereby, the closed cross section can be formed between the longitudinal member and the upper corner portion, and a plurality of ridgelines extending longitudinally at the longitudinal member can be provided. Accordingly, the two closed cross sections that are formed above and below the upper corner portion of the tunnel portion can increase further the rigidity of the upper corner portion of the tunnel portion. Also, the longitudinal member can increase the longitudinal-direction rigidity. Thus, the function of transmission of the impact load at the upper corner portion of the tunnel portion can be improved. Further, any improper interference with the longitudinal member can be prevented even in a case where a connection portion of a front end of the tunnel portion to the dash panel is formed with a curve face with a large curvature.

According to another embodiment of the present invention, either one of the members of the center-side frame member comprises a front portion that is formed substantially in a flat-plate shape and a rear portion that is formed in a projecting-bent-member shape. Thereby, the front portion in the flat-plate shape can be made properly flexible, while the rear portion in the projecting-bent-member shape can be formed properly hard. Accordingly, when the frontal-crash impact load acts, the front portion of the center-side frame member can absorb the impact by being bent properly, and the rear portion can provide the proper load-transmission function. Thus, the center-side frame member functions plural functions.

According to another embodiment of the present invention, the vehicle front structure further comprises an upper frame member that extends upward and outward so as to connect the front side frame to a front pillar of the vehicle body, and a lower frame member that extends downward and outward so as to connect the front side frame to a side sill of the vehicle body. Thereby, the impact load acting on the front side frame can be transmitted to the front pillar and the side sill as the rigidity members at the vehicle rear by the upper and lower frame members in addition to the center-side frame member. Accordingly, the large impact load can be dispersed properly to three members of the front pillar, side sill, and tunnel portion as the rigidity member at the vehicle rear portion. Thus, the function of the vehicle body against the vehicle frontal crash can be improved by using the three members that are disposed at locations extend in a radial direction from the location of the front side frame.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
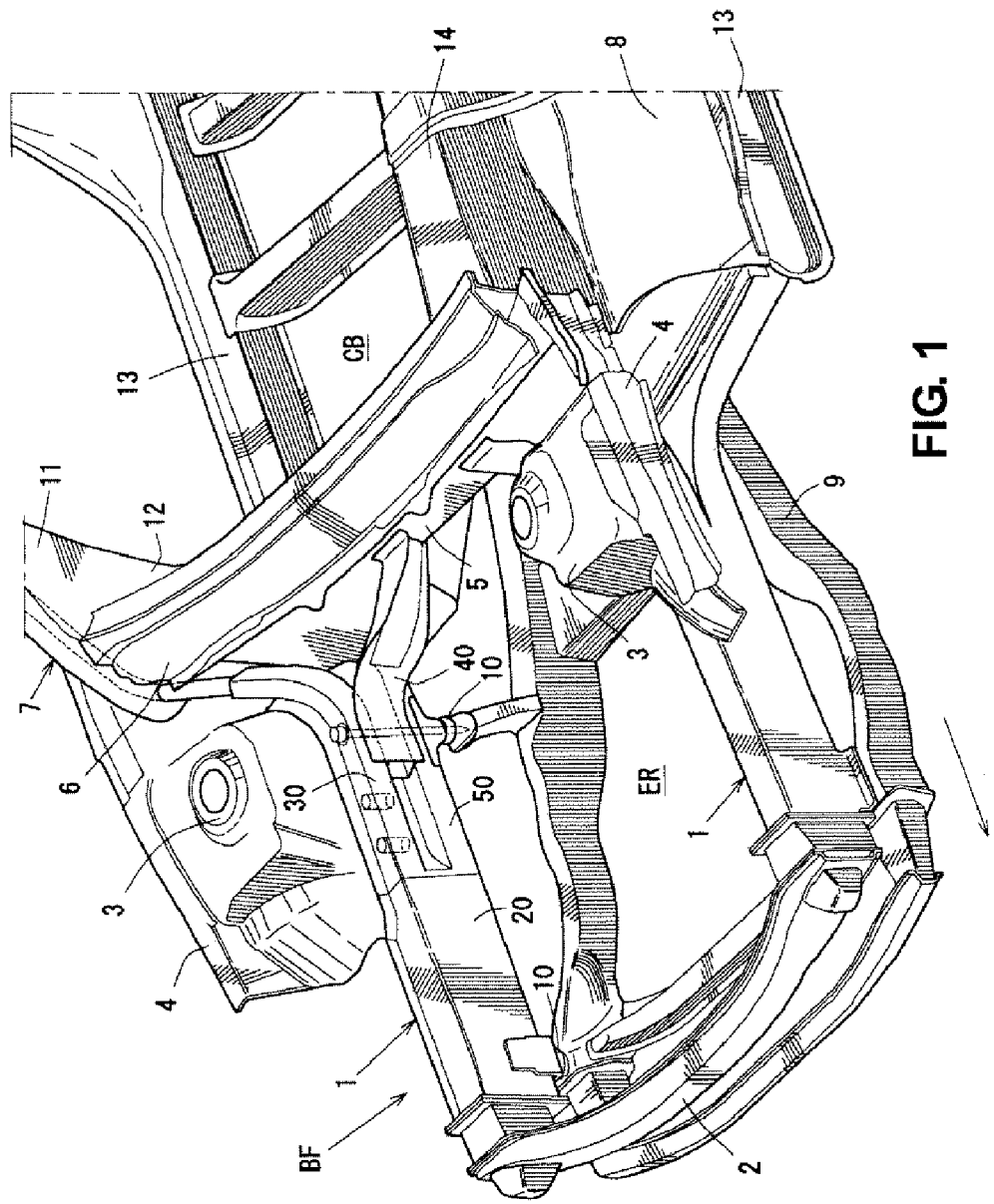
FIG. 1 is a perspective view of a vehicle front structure according to the present embodiment.
Figure 2:
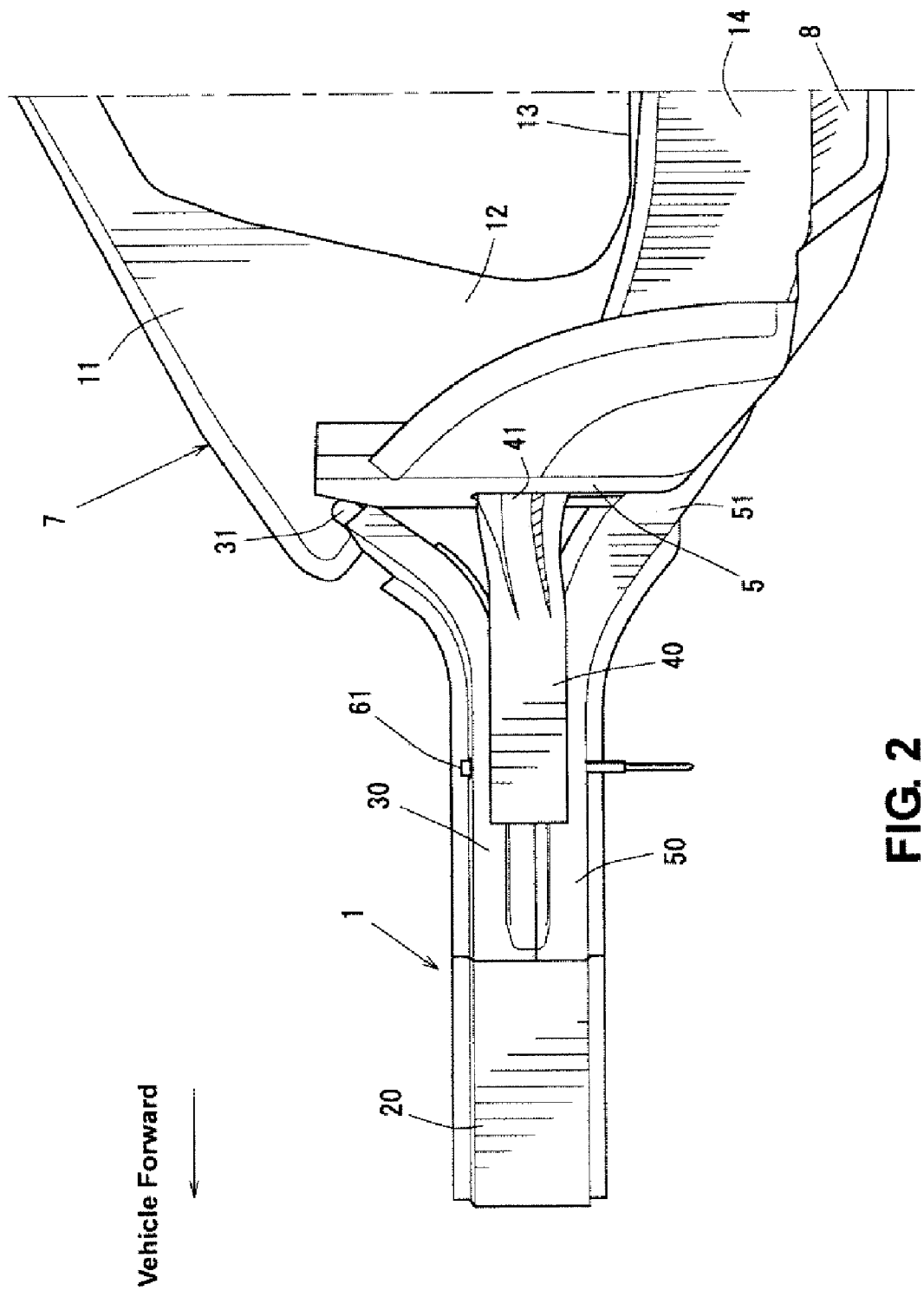
FIG. 2 is a side view of part of the structure including a right front side frame, when viewed from a vehicle inside.
Figure 3:
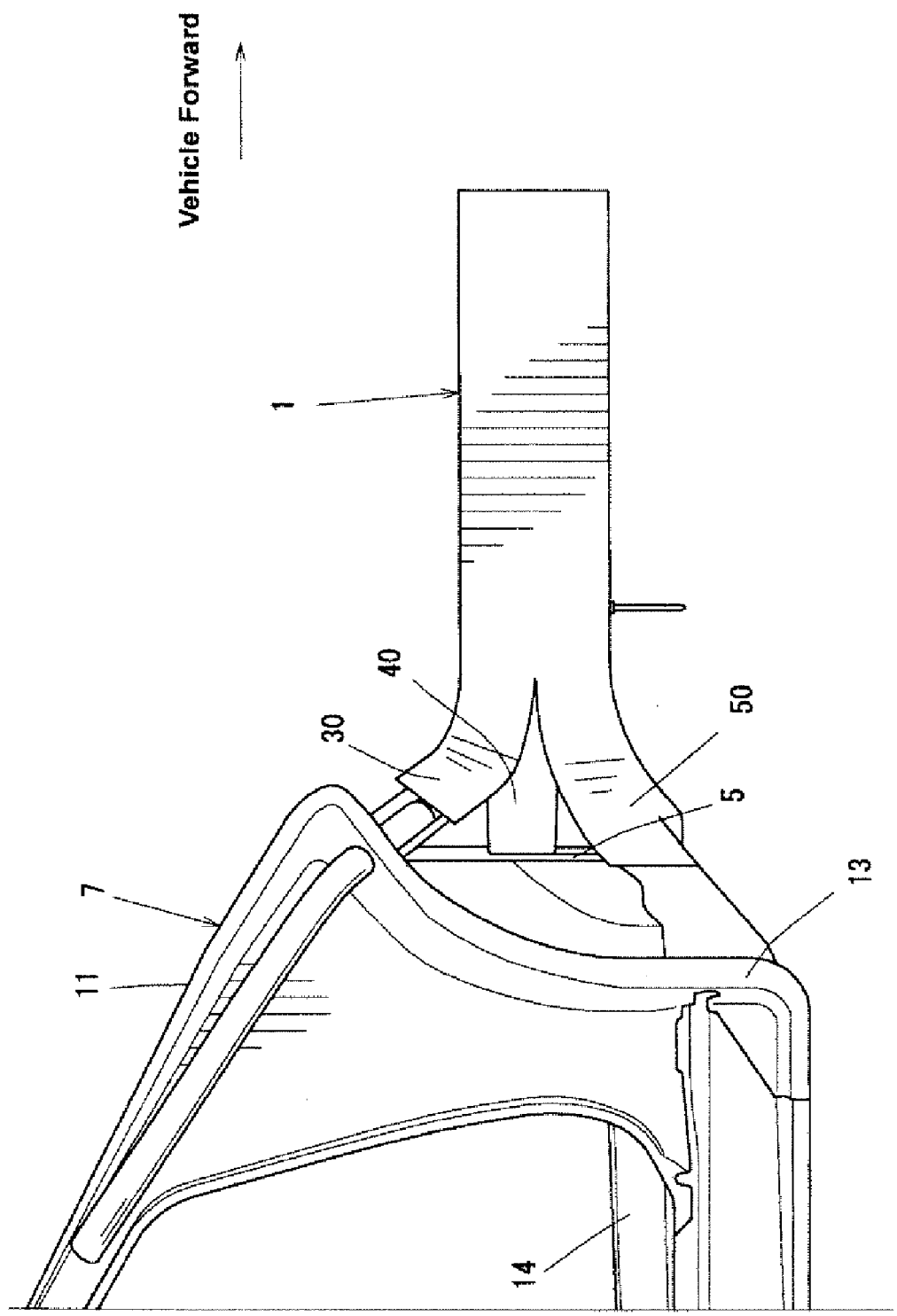
FIG. 3 is a side view of part of the structure including the right front side frame, when viewed from a vehicle outside.
Figure 4:
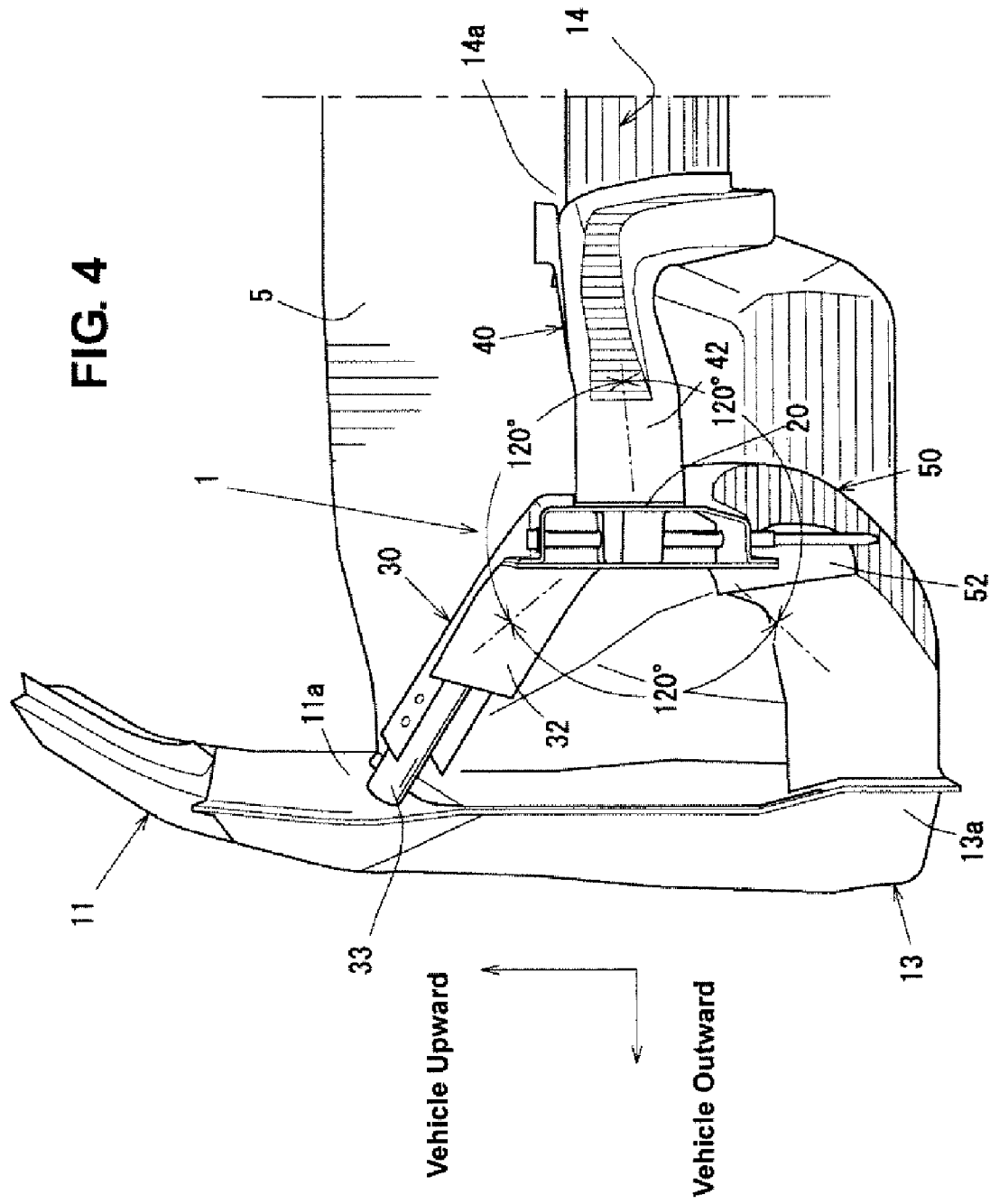
FIG. 4 is an elevation view of part of the structure including the right front side frame.
Figure 5:
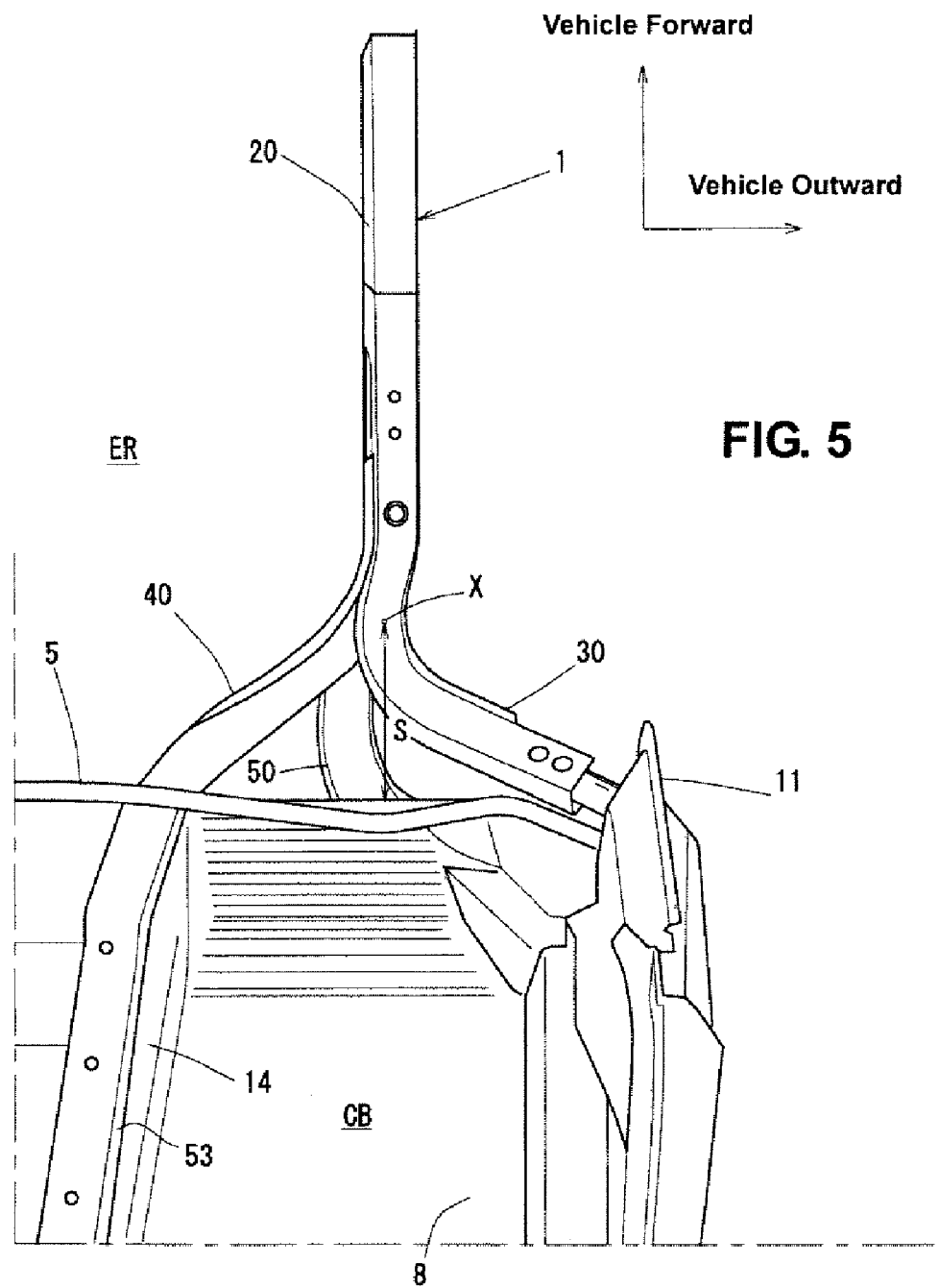
FIG. 5 is a plan view of part of the structure including the right front side frame.
Figure 6:
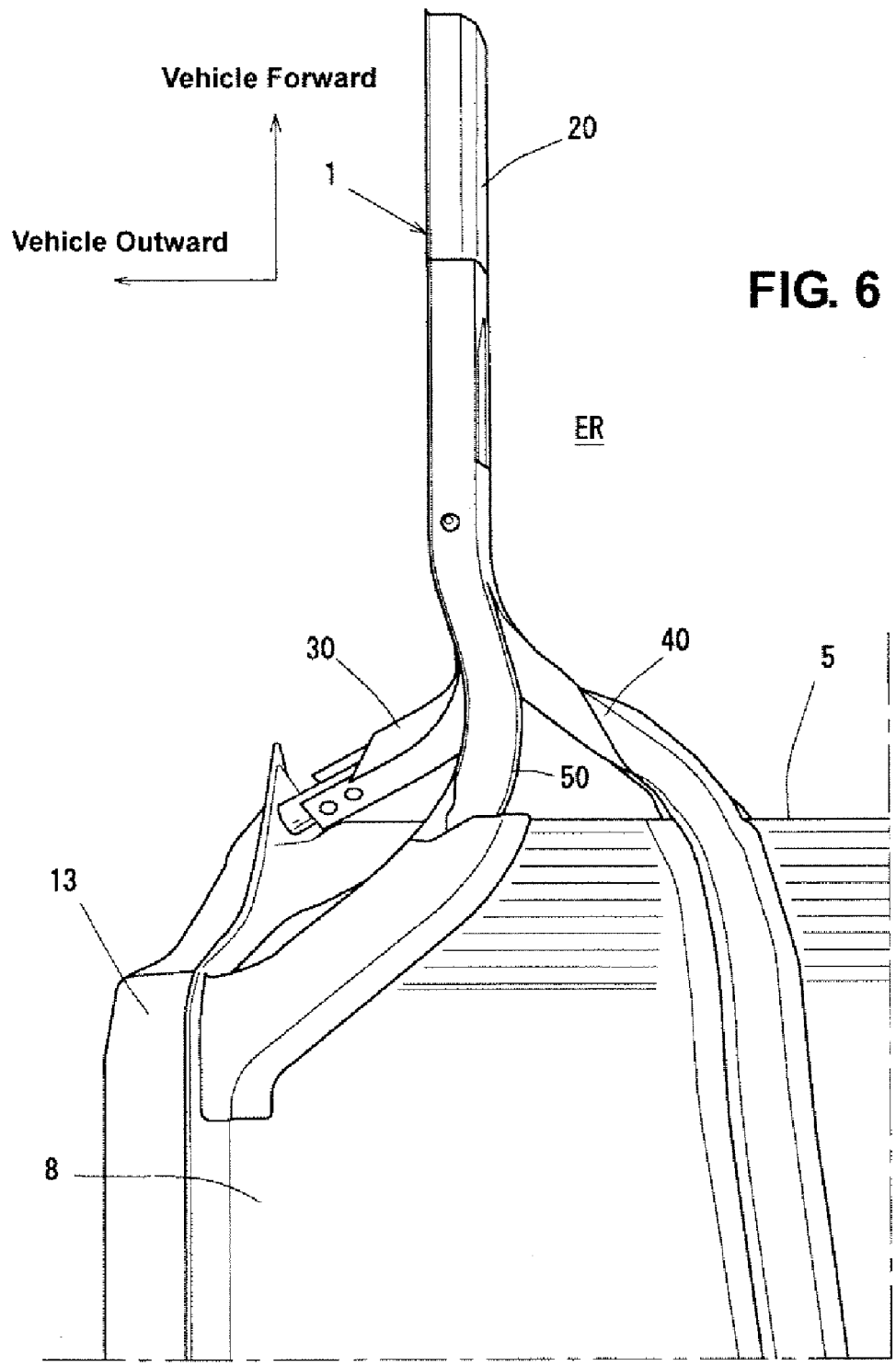
FIG. 6 is a bottom view of part of the structure including the right front side frame.

First, a whole part of a vehicle front structure according to the present embodiment will be described referring to FIGS. 1 through 6. FIG. 1 is a perspective view of a vehicle front structure according to the present embodiment. FIG. 2 is a side view of part of the structure including a right front side frame, when viewed from a vehicle inside. FIG. 3 is a side view of part of the structure including the right front side frame, when viewed from a vehicle outside. FIG. 4 is an elevation view of part of the structure including the right front side frame. FIG. 5 is a plan view of part of the structure including the right front side frame. FIG. 6 is a bottom view of part of the structure including the right front side frame. Herein, FIG. 3 shows a state where an outer panel is removed from a body side panel.

A vehicle front structure BF, as shown in FIG. 1, comprises a pair of front side frames 1, 1 that is provided at both sides of a vehicle body so as to extend in a vehicle longitudinal direction, a bumper frame 2 that extends in a vehicle width direction so as to interconnect respective front end portions of the front side frames 1, 1, suspension towers 3, 3 that stand substantially vertically on the outside of middle portions of the front side frames 1, 1, apron reinforcements 4, 4 that extend in the vehicle longitudinal direction on the outside of upper ends of the suspension towers 3, 3, a dash panel 5 that is provided behind the front side frames 1, 1 so as to extend laterally and vertically to partition an engine room ER from a vehicle compartment CB, a cowl box 6 that extends in the vehicle width direction at an upper end of the dash panel 5, body side panels 7 that are coupled to side ends of the cowl box to form side walls of the vehicle compartment, a floor panel 8 that extends rearward from a lower end of the dash panel 5 substantially horizontally.

A suspension frame 9 to support a front suspension device (not illustrated) is provided below the front side frames 1, 1. This frame 9 is fastened to the front side frame 1 and the floor panel 8 via rubber mounts 10, 10 and the like.

The above-described body side panel 7 comprises a front pillar 11 that is located above the connection point of the cowl box 6, a door hinge pillar 12 that is located below the connection point of the cowl box 6 and extends vertically, and a side sill 13 that extends rearward from a lower end of the hinge pillar 12 beside the floor panel 8.

The front side frames 1, 1, as shown in FIG. 2, comprise a front main frame portion 20 that extends in the vehicle longitudinal direction, and three branch frame portions 30, 40, 50 that branch at a rear portion thereof. The upper branch frame portion 30, middle branch frame portion 40 and lower branch frame portion 50 form the branch frame portion. Their rear end portions 31, 41, 51 are connected respectively to the front pillar 11 that is located at the upper and outside thereof, tunnel portion 14 that is located at the inside thereof, and the side sill 13 that is located at the lower and outside thereof as shown in FIG. 2.

Specifically, as shown in FIG. 4, the upper branch frame portion 30 curves upward and outward and then connect to a lower portion 11a of the front pillar 11, the middle branch frame portion 40 curves inward and then connects to a front-end upper corner portion 14a of the tunnel portion 14, and the lower branch frame portion 50 curves downward and outward and then connects to a front end 13a of the side sill 13.

According to the above-described structure, the branch frame portions 30, 40, 50 extend in a radial direction from the location of the main frame portion 20 with about 120 degrees angles in between in an elevation view as shown in FIG. 4. Thereby, an impact load acting from the vehicle front can be transmitted to the respective rigidity members (11, 13, 14) substantiality uniformly.

As shown in FIG. 5, a branch point X of the branch frame portions 30, 40, 50 is located forward away from the dash panel 5 so as to provide a deformation space S between them.

Thus, the branch frame portions 30, 40, 50 are configured to branch like a camera tripod, and the branch point X is configured to move backward into the deformation space S at the vehicle frontal crash. Thereby, the crash impact load can be absorbed at the branch frame portion 30, 40, 50 as well.

Further, the branch frame portions 30, 40, 50 are configured in a shape shown in FIGS. 2, 3, 5 and 6, in which they extend rearward and then curve toward the respective connection portions. Thus, these frame portions 30, 40, 50 can bend easily at respective curve portions thereof Further, these branch frame portions 30, 40, 50, as shown in FIG. 4, have flat-plate portions 32, 42, 52 on respective inside portions at their curve portions, which form closed cross sections of thereof Thereby, the frame portions 30, 40, 50 can bend further easily at the respective curve portions.

The upper branch frame portion 30 has a circular pipe 33 that is attached to a rear portion thereof. Thus, the rear portion of the upper branch frame portion 30 is prevented from deforming so that the impact load from the vehicle front can be transmitted to the front pillar 11 surely.

Figure 7:
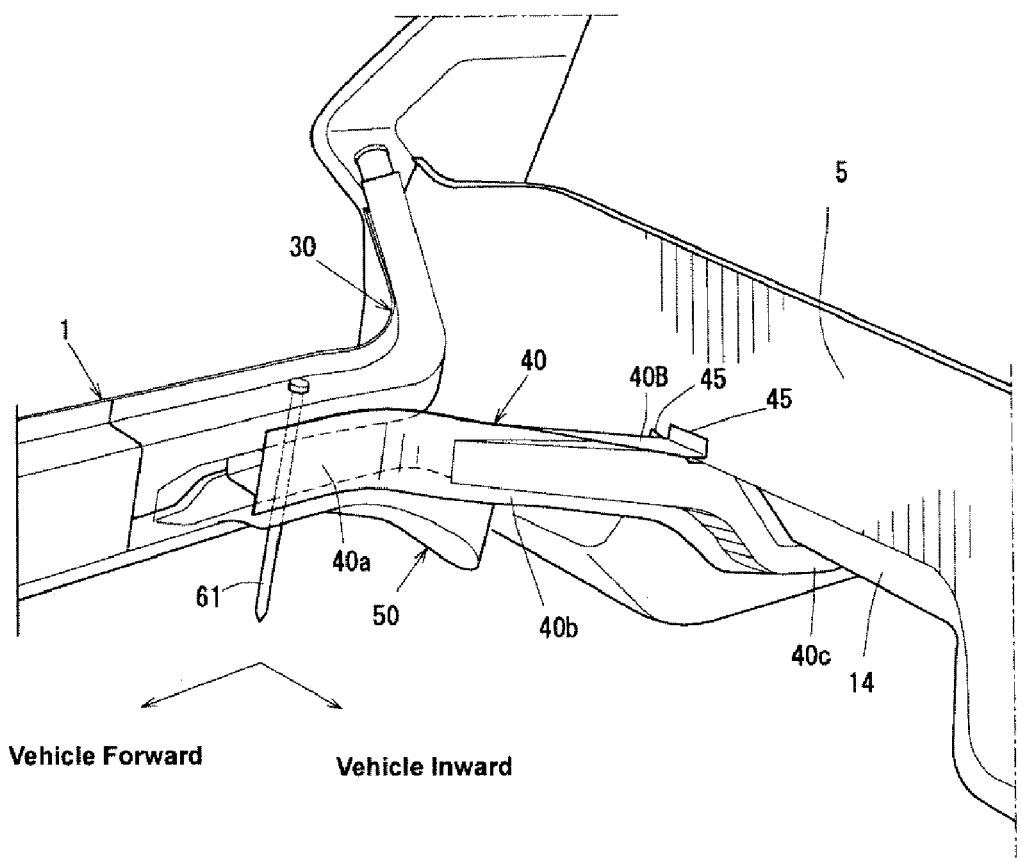
FIG. 7 is an upper perspective view of part of the structure including a branch portion of a middle branch frame portion, when viewed from the vehicle inside.
Figure 8:
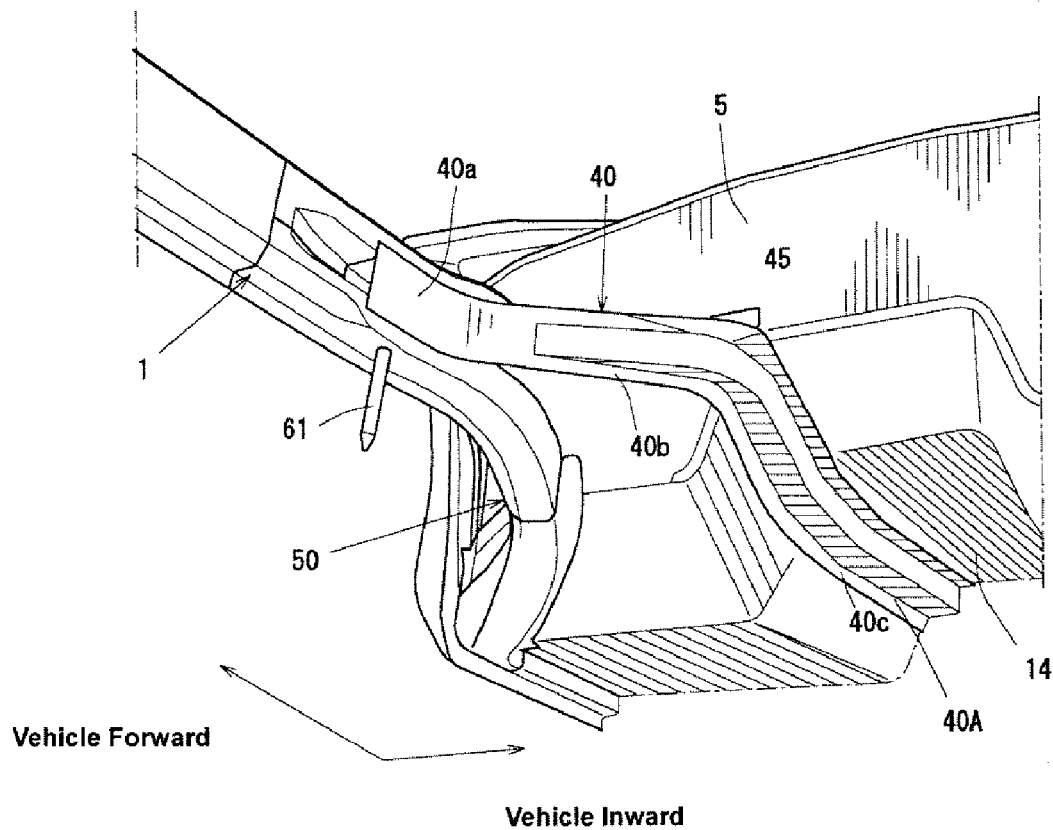
FIG. 8 is a lower perspective view of part of the structure including the branch portion of the middle branch frame portion, when viewed from the vehicle inside.
Figure 9:
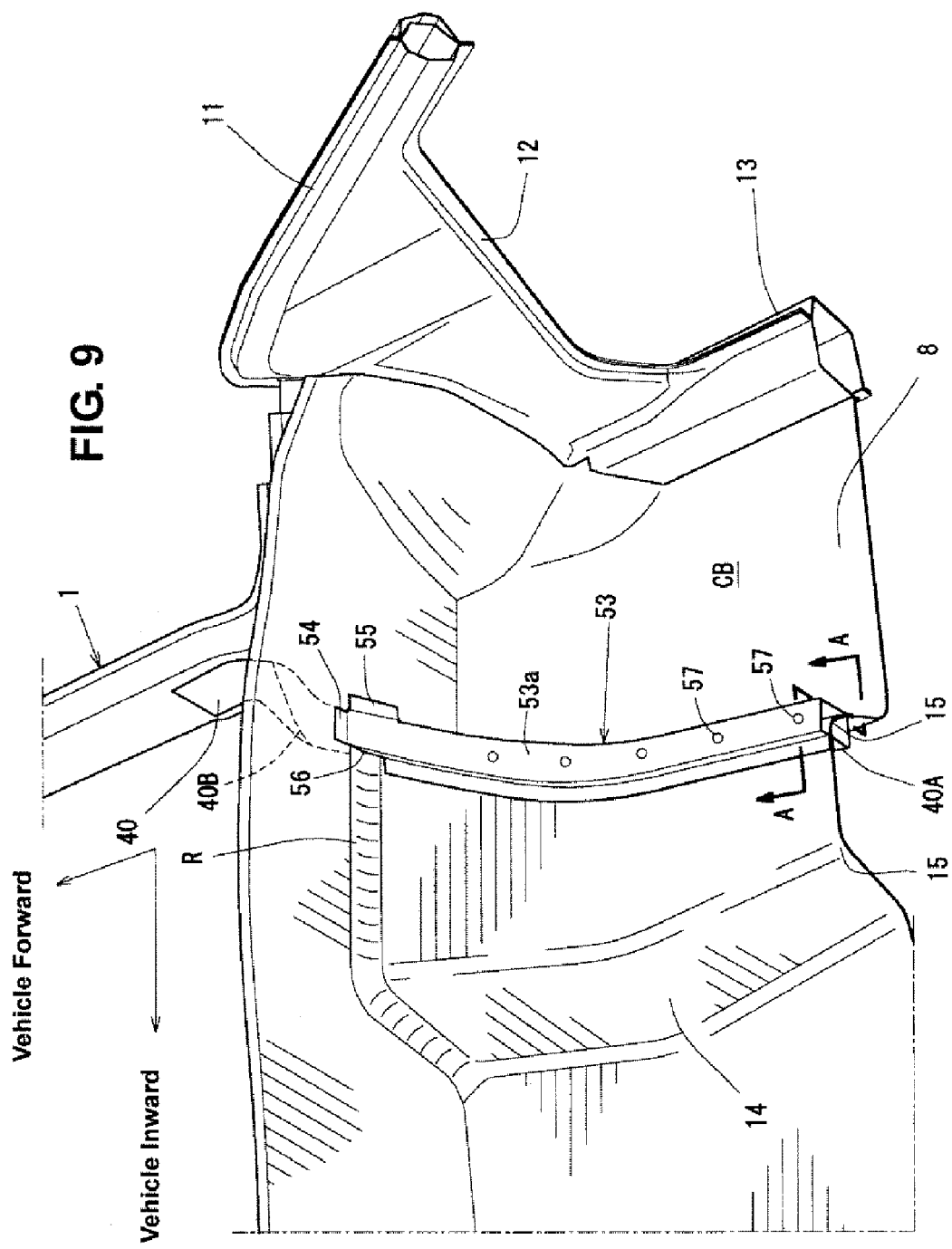
FIG. 9 is an upper perspective view of a vehicle-compartment-side face (rear-side face) of a dash panel, when viewed forward from the inside of a vehicle compartment.
Figure 10:
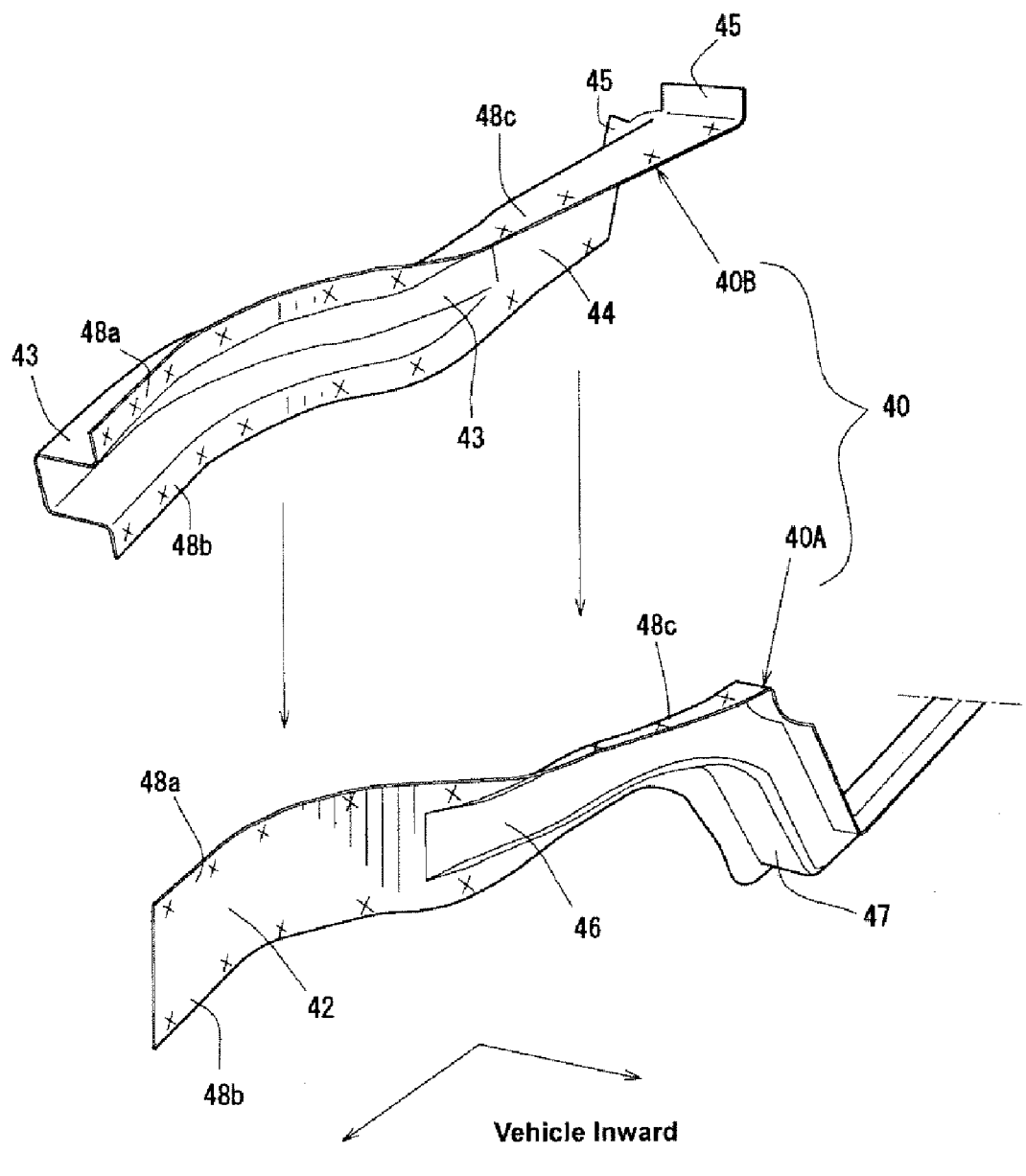
FIG. 10 is an explanatory diagram of assembling of member parts constituting a middle branch frame.
Figure 11:
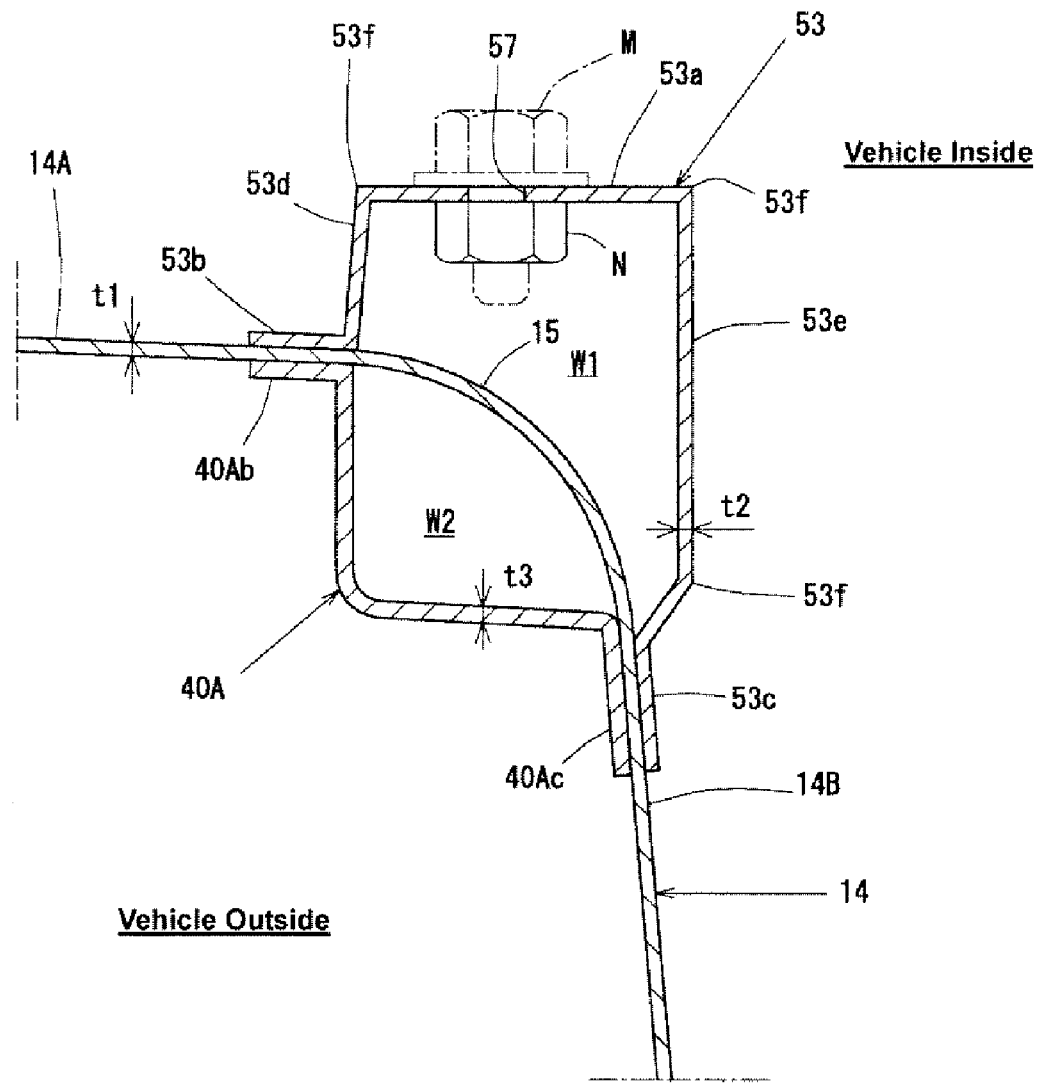
FIG. 11 is a sectional view taken along line A-A of FIG. 9.
Figure 12:
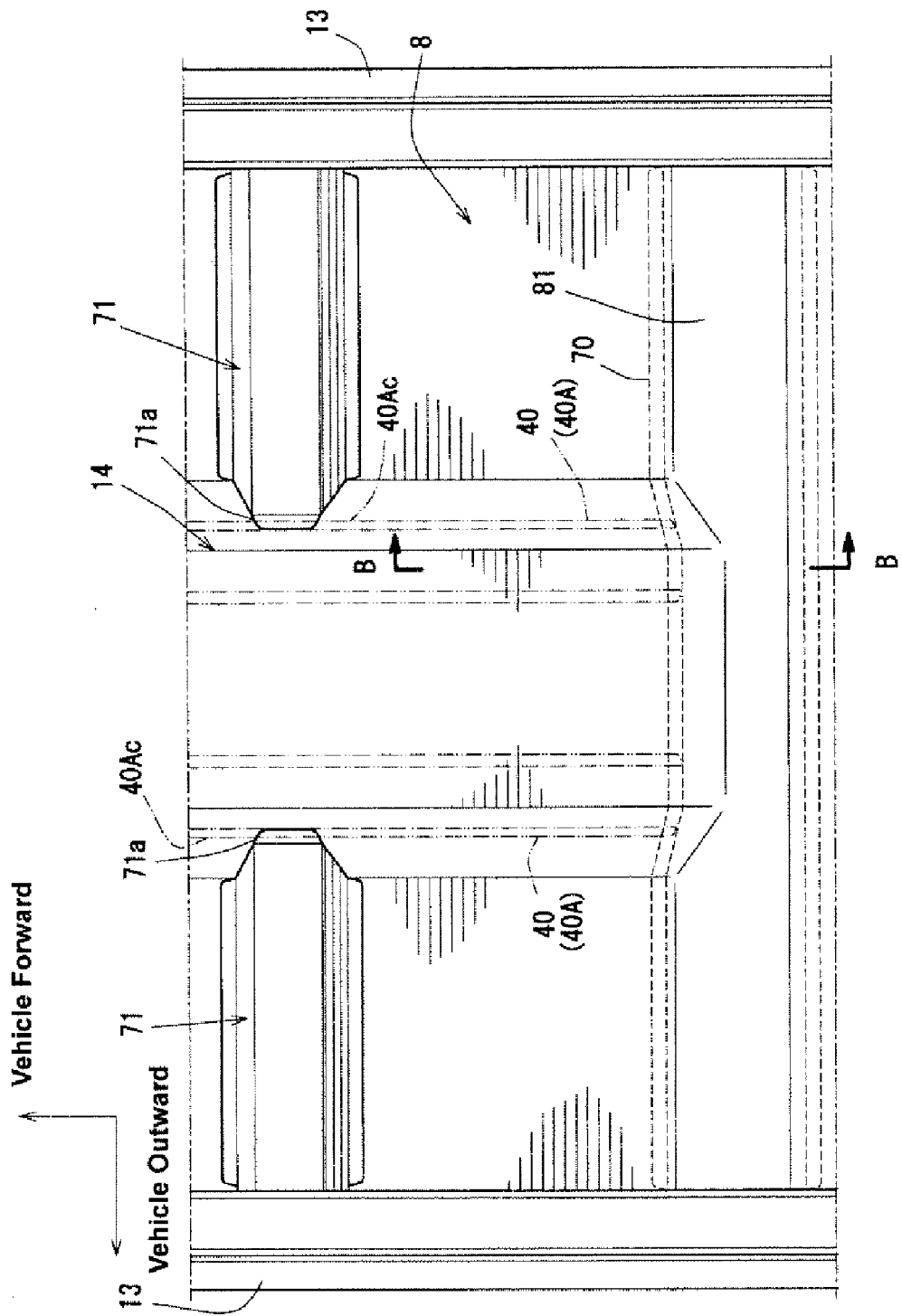
FIG. 12 is a plan view of part of the structure including a rear end of the tunnel portion at a rear portion in the vehicle compartment.
Figure 13:
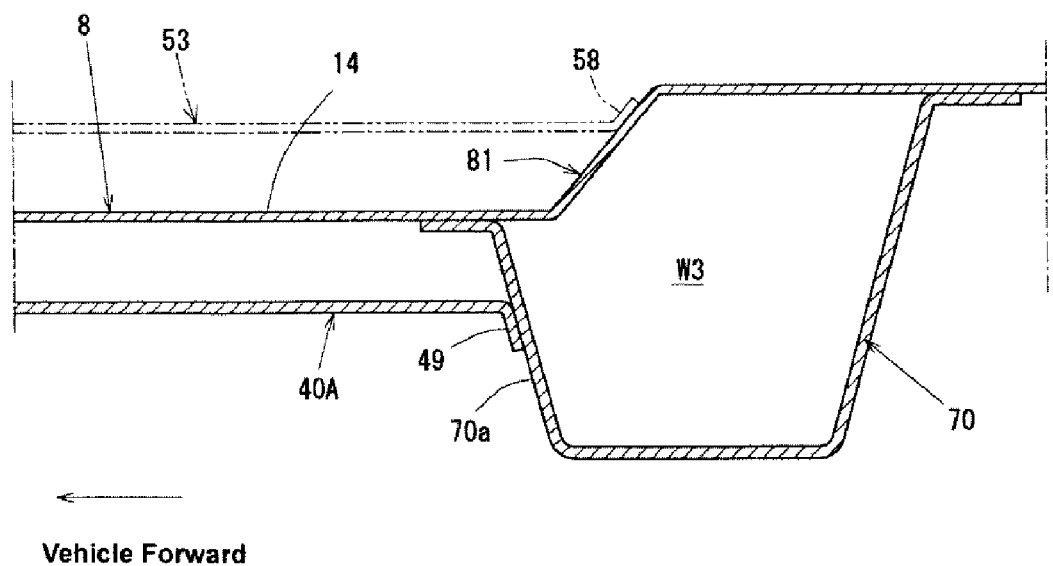
FIG. 13 is a sectional view taken along line B-B of FIG. 12.

Next, the structure of the middle branch frame portion 40 that is the features of the present embodiment will be described referring to FIGS. 7 through 13. FIG. 7 is an upper perspective view of part of the structure including the branch portion of the middle branch frame portion, when viewed from the vehicle inside. FIG. 8 is a lower perspective view of part of the structure including the branch portion of the middle branch frame portion, when viewed from the vehicle inside. FIG. 9 is an upper perspective view of a vehicle-compartment-side face (rear-side face) of the dash panel, when viewed forward from the inside of a vehicle compartment. FIG. 10 is an explanatory diagram of assembling member parts constituting the middle branch frame. FIG. 11 is a sectional view taken along line A-A of FIG. 9. FIG. 12 is a plan view of part of the structure including a rear end of the tunnel portion at a rear portion in the vehicle compartment. FIG. 13 is a sectional view taken along line B-B of FIG. 12.

The middle branch frame portion 40 of the present embodiment is configured as shown in FIG. 7 such that a front end portion 40a is connected to the front side frame 1 via a suspension-frame attaching bolt 61 to fasten the suspension frame 9, a middle portion 40b extends to the tunnel portion 14 that is provided at the center portion in the vehicle width direction so as to project upward, and a rear portion 40c is provided below (vehicle outside) an upper corner portion 15 (see FIG. 9) of the tunnel portion 14 so as to extend along the upper corner portion 15.

The middle branch frame portion 40, as shown in FIG. 10, comprises a lower member 40A and an upper member 40B.

Specifically, the upper-and-outward located upper member 40B and the lower-and-inward located lower member 40A are overlapped vertically as shown in an arrow and connected to each other via joint flanges or the like, thereby forming the frame member having the closed cross section.

A front portion of the upper member 40B is formed to have a U-shaped cross section with an engagement portion 43. A middle portion of the upper member 40B is formed to bend inward, and the projection amount of the engagement portion 43 becomes smaller gradually. A rear portion of the upper member 40B is formed to provide a member portion 44 having a reverse-L shaped cross section. A rear end of the member portion 44 has joint flanges 45, 45 that bend upward and outward respectively.

Meanwhile, a front portion of the lower member 40A is comprised of the flat-plate portion 42. A middle portion of the lower member 40A is formed to bend inward, and has a projection portion 46 that projects inward gradually at the center thereof. This projection portion 46 increases its projection gradually and forms a member portion 47 having a stepwise cross section at a rear portion thereof. The member portion 47 extends downward obliquely and then rearward.

The upper and lower members 40B, 40A are joined via joint flanges 48a, 48b at their front portions (joint points x). The upper-located joint flange 48a changes to a lateral flange 48a as shown.

The reason for providing the lateral flange 48a is to form the engagement portion 43 to connect to the front side frame 1 at the upper member 40B, locating the rear portion of the lower member 40A below the tunnel portion 14.

The middle branch frame portion 40 is configured such that the member forming the closed cross section of the frame mainly gradually changes from the upper member 40B to the lower member 40A. This is because the stepwise changing of the closed cross section may cause an improper concentration of stress at the change part.

Further, the lower member 40A has a projection portion 46 that projects from the flat-plate portion 42 gradually and a rear portion that connects to the member portion 47. Thus, while the front portion of the lower member 40A bends easily, the rear portion of the lower member 40A has a properly increased rigidity to improve the load transmission function.

Thus, the middle branch frame portion 40 is comprised of the upper member 40B and the lower member 40A that have different shapes and are joined each other, so the middle branch frame portion 40 functions as a member to transmit the impact load from the front side frame 1 to the tunnel portion 14.

The lower member 40A of the middle branch frame portion 40 is disposed so as to extend rearward further behind the dash panel S as shown in FIG. 8, so that its rear portion extends inside (below) the tunnel portion 14 along the tunnel portion 14.

Meanwhile, the upper member 40B, as shown in FIG. 7, is disposed so that its rear joint flanges 45, 45 contact and connect to the dash panel 5. Thus, only the lower member 40A forms the closed cross section with the tunnel portion 14 in back of the dash panel 5.

As shown in FIG. 9, an inside reinforcement member 53 is provided inside the vehicle compartment CB above the tunnel portion 14, a front end of which is connected to an inside-face portion of the dash panel 5 that corresponds to the above-described connection portion of the upper member 40B to the dash panel 5. The inside reinforcement member 53 has a U-shaped cross section and is disposed so as to extend in the vehicle longitudinal direction along the upper corner portion 15 of the tunnel portion 14 (only a right-side portion is shown in FIG. 9).

The inside reinforcement member 53 has an upper flange 54 and a lateral flange 55 for connecting to the dash panel 5 at its front end. It has also a curve portion 56 for avoiding a curve face portion R having a large curvature at its inside portion that corresponds to the connection portion of the dash panel 5 to the front end of the tunnel portion 14.

The inside reinforcement member 53 has plural attachment holes 57 . . . at its upper face portion 53a. These holes 57 . . . are for attachments of an airbag sensor, electric harness, instrument panel bracket, change lever, center console, parking brake, parking cable, or the like.

The inside reinforcement member 53 is, as shown in FIG. 11, placed on the upper corner portion 15 of the tunnel portion 14 (inside the vehicle compartment). The upper joint flange 53b is connected to an upper wall face 14A of the tunnel portion 14, and the lower joint flange 53c is connected to a side wall face 14B of the tunnel portion 14.

The upper face portion 53a is provided on an inside face portion 53d and an outside face portion 53e so as to be located above the upper wall face 14A of the tunnel portion 14. Thereby, a weld nut N can be placed inside the attachment hole 57 of the upper face portion 53a, so a specified attachment member (not illustrated) can be fastened and fixed by a bolt member M.

Further, to a lower face of the upper corner portion 15 of the tunnel portion 14 is fixed the lower member 40A of the middle branch frame portion 40. An upper joint flange 40Ab of the lower member 40A is fixed to the upper wall face 14A of the tunnel portion 14, and a lower joint flange 40Ac of the lower member 40A is fixed to the side wall face 14B of the tunnel portion 14. Thereby, the lower member 40A is joined to the lower side of the tunnel portion 14.

Thus, the joint of the inside reinforcement member 53 and the lower member 40A to the tunnel portion 14 forms an upper closed cross section W1 between the inside reinforcement member 53 and the tunnel portion 14 and a lower closed cross section W2 between the tunnel portion 14 and the lower member 40A.

Also, accordance of the connection positions of the joint flanges functionally constitutes functionally a single frame member with a larger closed cross section which is the total of the upper and lower closed cross sections W1, W2. Since the thickness t2 of the inside reinforcement member 53 and the thickness t3 of the lower member 40A are set to be thicker than the thickness t1 of the tunnel portion 14 in the present embodiment, the above-described single fame member can performs its function further properly.

Thus, there is provided the rigid structure with the closed cross section W1, W2 at the upper corner portion 15 of the tunnel portion 14, thereby increasing the rigidity of the upper corner portion 15 of the tunnel portion 14.

Accordingly, the impact load from the front side frame 1 can be dispersed to the tunnel portion 14.

FIG. 12 is a plan view of part of the structure including the rear end of the tunnel portion 14 (the inside reinforcement member 53 is removed in FIG. 12), and FIG. 13 is a sectional view of that part. As shown in the figures, the rear end of the middle branch frame portion 40 (lower member 40A) is connected to a rear cross member 70 that extends in the vehicle width direction.

The rear cross member 70, which extends in the vehicle width direction so as to interconnect both-side side sills, is disposed below a floor pick-up portion 81 that is formed by the floor panel 8 projects upward. The rear cross member 70, which has a U-shaped cross section, is joined to the lower face of the floor panel 8 so as to form a member structure.

A rear flange 49 of the rear end of the lower member 40A is connected to a front-side vertical face 70a of the rear cross member 70.

The joint flange 58 of the rear end of the inside reinforcement member 53 is connected to the floor pick-up portion 81, i.e., a closed cross section W3 of the rear cross member 70 as well as shown in FIG. 13.

Thus, according to the present embodiment, the lower member 40A and the inside reinforcement member 53 are connected to the rear cross member 70 and the like, so that the impact load from the front side frame 1 can be transmitted to the rear cross member 70 via the inside reinforcement member 53.

Thereby, the dispersion of the frontal impact load can be achieved effectively by using the vehicle rear member (70). Particularly, the impact load is supported at the rear cross member 70 extending in the vehicle width direction, so even the considerably large impact load can be supported.

Further, as shown in FIG. 12, an inside flange 71a of the center cross member 71 is joined so as to correspond to the lower joint flange 40Ac.

Thereby, the frontal impact load acting on the lower member 40A can be transmitted to the center cross member 70, thereby dispersing the load properly.

Hereinafter, the function and effects of the present embodiment will be described.

The vehicle front structure of the present embodiment comprises the tunnel portion 14 that is provided at the center portion of the dash panel 5 and the floor panel 8 of the vehicle compartment in the vehicle width direction so as to project upward, and the middle branch frame member 40 (40A) that is provided below the tunnel portion 14 so as to extend substantially along the upper corner portion 15 of the tunnel portion 14, the front end portion of which is located in front of the tunnel portion 14 and connected to the front side frame 1, the rear portion of which is located on the vehicle-inward side from the front end portion and connected to the lower face of the upper corner portion 15 of the tunnel portion 14 so as to form the lower closed cross section W2 with the upper corner portion 15 of the tunnel portion 14 (see FIG. 11).

Accordingly, the front side frame 1 and the tunnel portion 14 are connected by the middle branch frame member 40, and particularly at the rear portion of the middle branch frame member 40 is provided the loser closed cross section W2 that is formed between the upper corner portion 15 of the tunnel portion 14 and the middle branch frame member 40. Thereby, the considerably large frontal-crash impact load that acts on the front side frame 1 can be transmitted surely to the tunnel portion 14 as the rigidity member, thereby providing the proper dispersion of load to the tunnel portion 14. Particularly, since the lower closed cross section W2 is formed at the upper corner portion 15 of the tunnel portion 14 so that the load can be transmitted to the lower closed cross section W2, the structure of the present embodiment can support the crash impact against an offset-crash of the vehicle properly with this closed cross section W2.

Also, according to the present embodiment, the rear end of the middle branch frame member 40 is connected to the rear cross member 70 that is provided so as to extend in the vehicle width direction. Thereby, the load can be also transmitted to the rear cross member 70. Thus, the frontal-crash impact load can be supported surely by using the rear cross member 70 as the vehicle-body rigidity member at the vehicle rear.

Further, according to the present embodiment, the front portion of the middle branch frame member 40 has the closed cross section that is formed with the upper member 40B and the lower member 40A connected to each other, the upper member 40B is connected to the dash panel 5, and the inside reinforcement member 53 is provided inside the vehicle compartment above the tunnel portion 14 so as to extend substantially along the upper corner portion 15 of the tunnel portion 14, the front end of the inside reinforcement member 53 being connected to the inside-face portion of the dash panel 15 that corresponds to the connection portion of the upper member 40B to the dash panel 15. Thereby, since the inside reinforcement member 53 is provided inside the vehicle compartment so as to correspond to the upper member 40B of the middle branch frame member 40, the frontal-crash impact load can be also transmitted to the inside reinforcement member 53 inside the vehicle compartment. Accordingly, the proper dispersion of can be accomplished by using the inside reinforcement member 53 regardless of the strength of the dash panel 15. Thus, the larger impact load can be dispersed without reinforcing the dash panel 15.

Also, according to the present embodiment, the inside reinforcement member 53 and the middle branch frame member 40 are provided so as to form respective closed cross sections (the upper closed cross section W1 and the lower closed cross section W2) with the upper corner portion 15 of the tunnel portion 14. Thereby, the proper longitudinally-extending frame member with the closed cross sections (W1, W2) can be formed at the upper corner portion 15 of the tunnel portion 14 regardless of the structure, such as a shape, of the upper corner portion 15 of the tunnel portion 14. Thus, the frontal-crash impact load can be transmitted to the tunnel portion 14 without considering the strength of the upper corner portion 15 of the tunnel portion 14, thereby improving function of the vehicle body for the crash.

Further, according to the present embodiment, the inside reinforcement member 53 is provided on the tunnel portion 14 so as to form the closed cross section W1 with the upper corner portion 15 of the tunnel portion 14. Thereby, the closed cross section W1 can be formed between the inside reinforcement member 53 and the upper corner portion 15, and a plurality of ridgelines 53f... that extend longitudinally at the inside reinforcement member 53 can be provided as shown in FIG. 11. Accordingly, the two closed cross sections (the upper closed cross section W1 and the lower closed cross section W2) that are formed above and below the upper corner portion 15 of the tunnel portion 14 can increase further the rigidity of the upper corner portion 15 of the tunnel portion 14. Also, the inside reinforcement member 53 can increase the longitudinal-direction rigidity. Thus, the function of transmission of the impact load at the upper corner portion 15 of the tunnel portion 14 can be improved. Further, since the upper face portion 53a of the inside reinforcement member 53 is located at a high position, the inside reinforcement member 53 can be assembled avoiding interference with the curve face portion R (see FIG. 9) at the connection portion between the front end of the tunnel portion 14 and the dash panel 5.

Also, according to the present embodiment, the lower member 40A of the middle branch frame portion 40 comprises the front portion 42 that is formed substantially in the flat-plate shape and the rear portion 47 that is formed in the projecting-bent-member shape. Thereby, the Font portion 42 in the flat-plate shape can be made properly flexible, while the rear portion 47 in the projecting-bent-member shape can be formed properly hard. Accordingly, when the frontal-crash impact load acts, the front portion 42 of the middle branch frame portion 40 can absorb the impact by being bent properly, and the rear portion 47 can provide the proper load-transmission function. Thus, the middle branch frame portion 40 functions plural functions including the previously-described function of the camera tripod.

Further, according to the present embodiment, the vehicle front structure further comprises the upper branch frame member 30 that extends upward and outward so as to connect the front side frame 1 to the front pillar 11, and the lower branch frame member 50 that extends downward and outward so as to connect the front side frame 1 to the side sill 13. Thereby, the impact load acting on the front side frame 1 can be transmitted to the front pillar 11 and the side sill 13 as the rigidity members at the vehicle rear by the upper and lower branch frame members 30, 50 in addition to the middle branch frame member portion 40. Accordingly, the large impact load can be dispersed properly to three members of the front pillar 11, side sill 13, and tunnel portion 14 as the rigidity member at the vehicle rear portion. Thus, the function of the vehicle body against the vehicle frontal crash can be improved by using the three members (11, 13, 14) that are disposed at locations extend in the radial direction from the location of the front side frame 1. Particularly, since the difference in rigidity among the three members (11, 13, 14) can be made little by increasing the rigidity of the tunnel portion 14 with the lower member 40A of the middle branch frame portion 40 and inside reinforcement member 53, the load can be dispersed to the three members uniformly, thereby improving the function against the vehicle frontal crash surely.

Although the middle branch frame portion 40 is comprised of the two members of the upper and lower members 40A, 40B in the present embodiment, it may be comprised of a single member, three members or four members.

Also, the inside reinforcement member 53 may be modified so as to be a plate-shape member to merely reinforce the upper corner portion 15 of the tunnel portion 14 without forming the upper closed cross section W1.

In correspondence between the present invention and the above-described embodiment, the center-side frame member corresponds to the middle branch frame portion 40, the cross member corresponds to the rear cross member 70, the upper-located member corresponds to the upper member 40B, the longitudinal member corresponds to the inside reinforcement member 53, the upper frame member corresponds to the upper branch frame portion 30, and the lower frame member corresponds to the lower branch frame portion 50.

However, the present invention should not be limited to the above-described embodiment, and any other modifications and improvements may be applied.

What is claimed is:

1. A vehicle front structure, comprising:
a pair of front side frames provided at both sides of a vehicle body so as to extend in a vehicle longitudinal direction;
a dash panel provided behind the front side frames so as to partition an engine room from a vehicle compartment;
a tunnel portion provided at a center portion of the dash panel and a floor panel of the vehicle compartment in a vehicle width direction so as to project upward; and
a center-side frame member provided below the tunnel portion so as to extend substantially along an upper corner portion of the tunnel portion, a front end portion of which is located in front of the tunnel portion and connected to the front side frame, a rear portion of which is located on a vehicle-inward side from the front end portion and connected to a lower face of the upper corner portion of the tunnel portion so as to form a substantially closed cross section with the upper corner portion of the tunnel portion,
wherein a connection point of the front end portion of said center-side frame member to said front side frame is located forward away from said dash panel so as to provide a defonnation space.

2. The vehicle front structure of claim 1, wherein a rear end of said center-side frame is connected to a cross member that is provided so as to extend in the vehicle width direction.

3. The vehicle front structure of claim 1, wherein a front portion of said center-side frame has a substantially closed cross section that is formed with two members connected to each other, an upper-located member of the two members is connected to an outside-face portion of said dash panel, and a longitudinal member is provided inside the vehicle compartment above the tunnel portion so as to extend substantially along said upper corner portion of the tunnel portion, a front end of the longitudinal member being connected to an inside-face portion of the dash panel that corresponds to a connection portion of the upper-located member to the dash panel.

4. The vehicle front structure of claim 3, wherein said longitudinal member and said center-side frame member are provided so as to form respective closed cross sections with the upper corner portion of the tunnel portion.

5. The vehicle front structure of claim 3, wherein said longitudinal member is provided on the tunnel portion so as to form a substantially closed cross section with the upper corner portion of the tunnel portion.

6. The vehicle front structure of claim 3, wherein either a lower member of the center-side frame member comprises a front portion that is formed substantially in a flat-plate shape and a rear portion that is formed in a projecting-bent-member shape.

7. A vehicle front structure comprising:
- a pair of front side frames provided at both sides of a vehicle body so as to extend in a vehicle longitudinal direction;
- a dash panel provided behind the front side frames so as to partition an engine room from a vehicle compartment;
- a tunnel portion provided at a center portion of the dash panel and a floor panel of the vehicle compartment in a vehicle width direction so as to project upward;
- a center-side frame member provided below the tunnel portion so as to extend substantially along an upper corner portion of the tunnel portion. a front end portion of which is located in front of the tunnel portion and connected to the front side frame, a rear portion of which is located on a vehicle-inward side from the front end portion and connected to a lower face of the upper corner portion of the tunnel portion so as to form a substantially closed cross section with the upper corner portion of the tunnel portion;
- an upper frame member that extends upward and outward so as to connect the front side frame to a front pillar of the vehicle body; and
- a lower frame member that extends downward and outward so as to connect the front side frame to a side sill of the vehicle body.

8. A vehicle front structure, comprising:
- a pair of front side frames provided at both sides of a vehicle body so as to extend in a vehicle longitudinal direction;
- a dash panel provided behind the front side frames so as to partition an engine room from a vehicle compartment;
- a tunnel portion provided at a center portion of the dash panel and a floor panel of the vehicle compartment in a vehicle width direction so as to project upward;
- a center-side frame member provided below the tunnel portion so as to extend substantially along an upper portion of the tunnel portion, a front end portion of which is located in front of the tunnel portion and connected to the front side frame, a rear portion of which is located on a vehicle-inward side from the front end portion and connected to a lower face of the upper portion of the tunnel portion so as to form a substantially closed cross section with the upper portion of the tunnel portion; and
- an upper frame member that extends upward and outward so as to connect the front side frame to a front pillar of the vehicle body.

9. The vehicle front structure of claim 8, wherein a front end portion of said upper frame which is connected to the front side frame is located substantially at the same position as said front end portion of the center-side frame member which is connected to the front side frame.

10. A vehicle front structure comprising:
- a pair of front side frames provided at both sides of a vehicle body so as to extend in a vehicle longitudinal direction;
- a dash panel provided behind the front side frames so as to partition an engine room from a vehicle compartment;
- a tunnel portion provided at a center portion of the dash panel and a floor panel of the vehicle compartment in a vehicle width direction so as to project upward;
- a center-side frame member provided below the tunnel portion so as to extend substantially along an upper portion of the tunnel portion, a front end portion of which is located in front of the tunnel portion find connected to the front side frame, a rear portion of which is located on a vehicle-inward side from the front end portion and connected to a lower face of the upper portion of the tunnel portion so as to form a substantially closed cross section with the upper portion of the tunnel portion; and
- a lower frame member that extends downward and outward so as to connect the front side frame to a side sill of the vehicle body.

11. The vehicle front structure of claim 10, wherein a front end portion of said lower frame which is connected to the front side frame is located substantially at the same position as said front end portion of the center-side frame member which is connected to the front side frame.

* * * * *